United States Patent [19]

West

[11] Patent Number: 4,697,795

[45] Date of Patent: Oct. 6, 1987

[54] HYDRAULICALLY DAMPED MOUNTING DEVICE

[76] Inventor: John P. West, 32 Mill Rd., Worton, Devizes, Wiltshire, England

[21] Appl. No.: 826,858

[22] Filed: Feb. 6, 1986

[30] Foreign Application Priority Data

Feb. 7, 1985 [GB] United Kingdom ............... 8503144

[51] Int. Cl.$^4$ .................................. F16F 5/00
[52] U.S. Cl. .............................. 267/186; 267/140.1
[58] Field of Search ............. 188/130; 267/11 A, 12, 267/13, 121, 140.1, 140.5, 141.7

[56] References Cited

U.S. PATENT DOCUMENTS

| | | | |
|---|---|---|---|
| 1,823,694 | 9/1931 | Moorhouse | 267/11 A |
| 1,957,529 | 5/1934 | Deutsch | 267/11 A |
| 2,705,118 | 3/1955 | Beck | 267/121 X |

FOREIGN PATENT DOCUMENTS

| | | | |
|---|---|---|---|
| 0142943 | 5/1985 | European Pat. Off. | |
| 0164887 | 12/1985 | European Pat. Off. | |
| 707701 | 4/1931 | France | 267/11 A |
| 2364373 | 4/1978 | France | |
| 2465927 | 3/1981 | France | |
| 1568178 | 3/1981 | United Kingdom | |

Primary Examiner—Duane A. Reger
Attorney, Agent, or Firm—Merchant, Gould, Smith, Edell, Welter & Schmidt

[57] ABSTRACT

A hydraulically damped mounting device has two bushes connected together by an elongate bar. Each bush has a housing containing an anchor point connected to the housing by a resilient spring. Each spring, and part of the corresponding housing defines a working chamber for hydraulic fluid, the working chambers being interconnected by a passageway in the bar. The working chambers are positioned in the housing so that movement of the anchor points in opposing directions causes a decrease in size of one working chamber and an increase in size in the other. This change in size causes fluid movement through the passageway, and this exerts damping on the movement of the anchor points. Thus, when the device is connected between two objects with each anchor point connected to a corresponding one of the objects, relative vibration of the objects, and in particular torsional vibration may be damped.

10 Claims, 9 Drawing Figures

HYDRAULICALLY DAMPED MOUNTING DEVICE

BACKGROUND OF THE INVENTION

1. Field of the Invention

The present invention relates to a hydraulically damped mounting device.

2. Description of the Prior Art

Mounting devices are known from e.g. our European patent application No. 0115417 and U.K. patent application No. 84.20035 having two anchor points connected together by a resilient spring, the resilient spring defining one wall of a working chamber for hydraulic fluid connected by an elongate passageway to another chamber. Relative movement of the anchor points causes a change in the volume of the chamber bounded by the resilient wall. This forces the fluid through the passageway and the viscosity causes damping of the movement.

Such mounting devices are used, for example, to mount a car engine in the body so that vibration of the engine is damped before it is transmitted to the car body. For suitable mounting three or more such mounting devices may be provided to support the engine at separate positions. However, it has been found that this arrangement for damping the vibration of the engine is unsatisfactory for torsional movement. Since each mounting device is independent, different damping effects may result at different points of the engine and this may accentuate, rather than diminish, torsional movement. This is a particular problem because it is desirable that the natural frequency of the mounted system under torsional vibration is high and this may result in the natural frequency being excited by the engine vibration, causing resonance.

Therefore the present invention proposes a mounting device with at least two working chambers interconnected by an elongate passageway and held apart by an elongate rigid member. The result is a hydraulically damped tie-rod which may be interconnected between one vibrating body and another (e.g. between an engine and the car body) which resists torsional movement.

Preferably the mounting device has two bushes connected together by a rigid bar or rod. Each bush has a resilient spring which connects the bush to an anchor point and which acts as one wall of a working chamber within the bush. The working chambers are connected together by an elongate passageway which conveniently may be formed by a bore in the rod.

Each spring may also bound a second working chamber filled with hydraulic fluid, which chambers are connected by a second passageway. This increases the damping force and makes for a more symmetrical construction because each vibration then causes a compression of one of each pair of chambers and an expansion of the other pair. When there is only one pair of chambers, the spring attached to anchor point is compressed while the other expands. The effect of this may be to create unequal damping.

The chambers are normally arranged so as to resist forces causing compression or tension in the rod.

One suitable arrangement has each bush in the form of a hollow unit with the anchor point approximately centrally within the bush and the spring extending from the anchor point to the surounding walls of the bush, so that the working chamber is bounded by the spring and by a part of the inner wall of the bush. When there is only one working chamber within each bush, the rest of the interior of the bush may be filled with air, which is preferably vented to the atmosphere to prevent temperature changes causing a change in characteristics. When there are two working chambers within each bush the spring may divide the interior of the bush into two, so that the two chambers fill the bush.

By suitable selection of the length and cross-sectional area of the passageway the damping effect may be adjusted so that the damping is optimised at the resonant frequency of torsional vibrations.

In order to improve the high frequency damping effect it would be possible to provide gas pockets within the working chambers, the gas pockets being bounded by a diaphragm as in EP-A No. 84.300406.0.

The resilient spring is preferably made of rubber or similar material. However, such materials should not be under tensile loads. Therefore it is desirable that the resilient spring is pre-compressed during the manufacture of the mount so that it remains under compression during all vibrations.

BRIEF DESCRIPTION OF THE DRAWINGS

Embodiments of the invention will now be described, by way of example, with reference to the accompanying drawings, in which.

DETAILED DESCRIPTION

Figure 1:
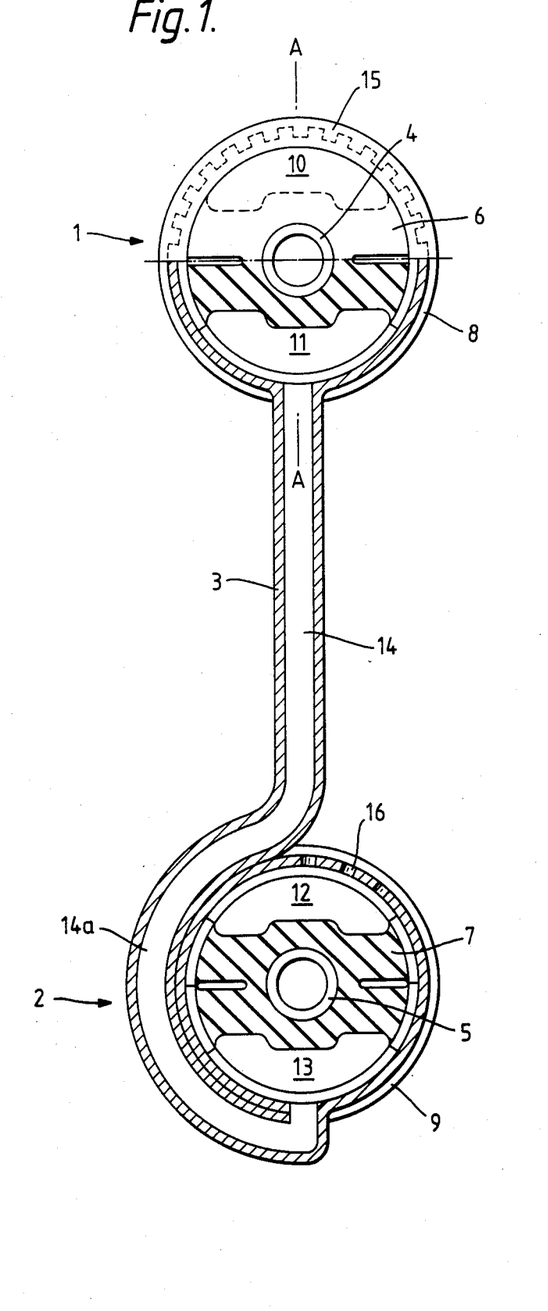
FIG. 1 shows a hydraulically damped tie-rod, being an embodiment of the present invention.
Figure 2:
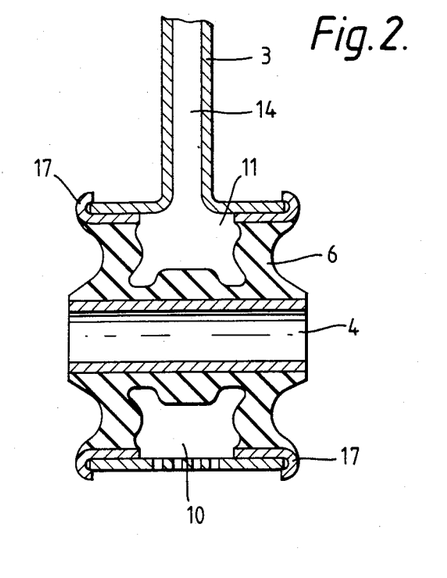
FIG. 2 is a section along the line A—A in FIG. 1.

Referring to FIG. 1, a hydraulically damped tie-rod according to a first embodiment of the present invention has two bushes 1,2 connected by a hollow rod 3, each bush having an anchor point in the form of a central sleeve 4,5. The sleeves 4,5 are adapted for fixing to those parts that are to be linked by the tie-rod, and are mounted within similar resilient insert springs 6,7 made of rubber or rubber-type material. The insert springs 6,7 are themselves held tightly within respective tubular housings 8,9 which in this embodiment are integral with the connecting rod 3. The shape of springs 6,7 is such that they hold sleeves 4,5 in portions concentric with the respective housings 8,9 in the absence of deforming forces. Moreover, chambers 10,11,12,13 are defined between surfaces of the springs 6,7 and the inner surfaces of housing 8 and 9. The chambers lie on the axis of the tie-rod assembly, so that there are two inner chambers 11,12 and two outer chambers 10,13. Movement of one of the sleeves 4,5 with respect to its housing 8 or 9 therefore causes an increase in volume of one chamber and a decrease in the volume of the other within that housing.

As mentioned above, bushes 1 and 2 are rigidly connected by a hollow rod 3, and this provides communication by means of a bore forming a passageway 14 between the inner chamber 11 of bush 1 and the outer chamber 13 of bush 2. Access to the outer chamber 13 is provided via a curved part 14a of the passageway and rod 3, which passes circumferentially around the outside of the housing 9. The closed system thus formed is filled with a hydaulic fluid, so that, for example, pressure on spring 6 tending to reduce the volume of chamber 11 is transmitted via the hydraulic fluid through passageway 14 and thereby tends to increase the volume of chamber 13. The movement of the fluid is restricted by the need to increase the volume of chamber 13 and by viscosity effects, so damping the movement.

The second pair of chambers 10,12 are neither connected nor filled with hydraulic fluid, but the parts of tubular housings 8,9 that bound these chambers are provided with sets of holes 15,16 that allow substantially free passage of atmospheric air in and out of chambers 10 and 12.

FIGS. 1, 2, 3, and 4 make clear the structure of the insert springs 6 and 7. These are enlarged at each end of their tubular housings 8 and 9 so as to completely occupy the area of the housings and thereby close off the chambers 10,11,12,13 at these ends. Because the rubber and rubberlike materials used for springs 6 and 7 are not strong in tension, the springs are initially moulded with a diameter significantly greater than that of housings 8,9 and subsequently compressed in order to be inserted into the housings. The pre-compression shape of the springs, the provision of semi-circular metal flanges 17, and of seals 18 to prevent leakage of fluid between spring and housing, may be seen in FIGS. 3 and 4. The springs 6,7 are first moulded around the sleeves 4,5 to the flanges 17. Then the flanges 17 are fitted within housing parts 8a, 8b (see FIG. 3) with gaps 19 between those parts 8a, 8b. At this point the springs 6,7 are not under compression. Then the housing parts 8a, 8b are forced together, closing the gaps 19 and applying a compressive force to the springs 6,7. The seals 18 are also compressed between the housing parts 8a, 8b and the flanges 17 to ensure the closure of any leakage path. This compression means that even a substantial radial displacement of one of the sleeves 4,5 within its housing 8,9 will not subject the spring 6,7 to tensile forces.

The springs 6,7 together with the sleeve 4,5 are prevented from sliding out of the housings 8,9 by the rolled-over edges of the flanges 17 to which the springs are initially moulded.

In use, the sleeves 4,5 at the centre of bushes 1,2 are fixed to the two parts that are to be linked. These might be, for example, an engine and a surrounding part of a vehicle, wherein it is desired to damp torsional vibrations of the mounted system at a resonance frequency excited by the engine vibration. Relative vibration between these two parts will alternately force the two sleeves towards one another and away from one another. When they are forced together, inner chambers 11 and 12 tend to contract, while outer chambers 10 and 13 tend to expand. For these volume changes to take place, hydraulic fluid must pass from chamber 11 via passageway 14 into chamber 13. When the sleeves 4,5 move apart in the second phase of the vibration, the fluid must pass in the reverse direction. The inertial and viscous resistance of the fluid to moving quickly in this fashion provides the desired damping effect on the vibration.

It is apparent that the length and cross-sectional area of the passageway 14 can be varied in construction, so as to provide tie-rods giving optimum damping over desired frequency ranges. Very high frequency vibrations, which are generally of small amplitude, are largely absorbed within the springs 6 and 7. A gas pocket may be provided communicating with each chamber as discussed in EP-A No. 84.300406.0 to improve the absorption of the high frequency vibrations.

Air in the chambers 10 and 12 is free to pass through holes 15 and 16 during vibration, and this also prevents changes in the behaviour of the tie-rod due to thermal expansion and contraction.

Figure 5:
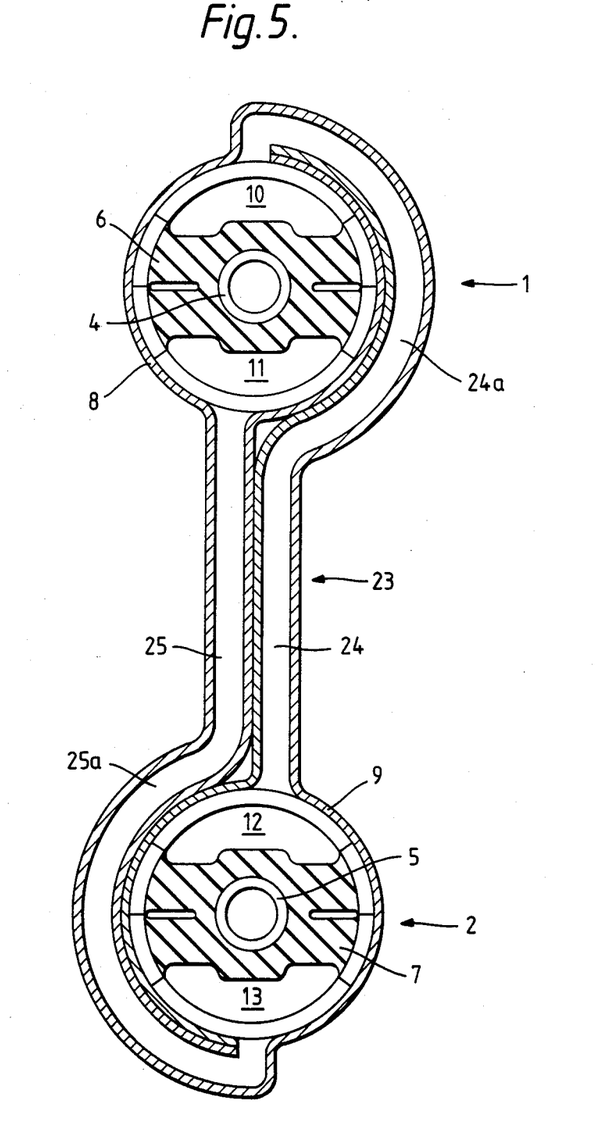
FIG. 5 shows a hydraulically damped tie-rod, being a second embodiment of the present invention.

The second embodiment shown in FIG. 5 includes bushes 1,2 similar to those described for the first embodiment, having central sleeves 4,5, resilient insert springs 6,7 and housings 8,9 with chambers 10,11,12,13 formed within them. This second embodiment is generally similar to the first, and so the same reference numerals are used for corresponding parts. In the second embodiment, however, the bushes 1,2 are joined by a rod 23, having two passageways 24,25 defined by bores within it, so that passageway 2 communicates between chambers 10 and 12, while passageway 25 communicates between chambers 11 and 13. Access to the outer chambers 10,13 is provided via curved parts 24a and 25a of the passageways 24,25 that pass circumferentially around the outside of housings 8 and 9 respectively. Both of the two closed systems thus formed are filled with hydraulic fluid; there are no air filled chambers and no vent holes through the housing to allow access to the atmosphere as there were in the first embodiment.

In use, the second embodiment of the invention works similarly to the invention, except that relative movements of the sleeves 4,5 cause fluid to pass between chambers 10 and 12 as well as between chambers 11 and 13. Again, the damping effect thus produced may be optimised against the range of possible frequencies by selecting the constructional parameters of the communicating passageways 24 and 25.

Figure 3:
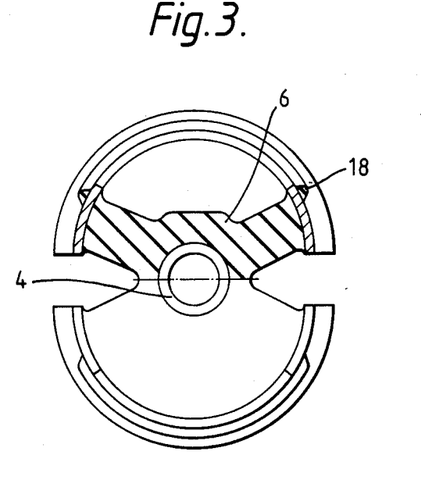
FIG. 3 shows an axial view and section of a bushing moulded, before insertion into a housing.
Figure 4:
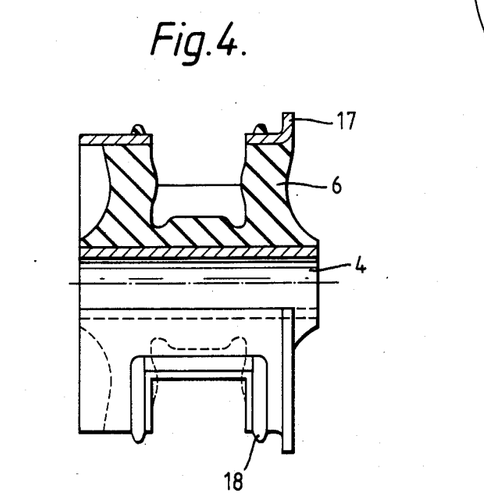
FIG. 4 shows a radial view and section of the bushing of FIG. 3.

The formation of a bush by the method illustrated in FIGS. 3 and 4 is complicated, however, due to the presence of the split flange. When moulding the springs 6,7, it is necessary to ensure that satisfactory bonds are obtained to both parts of the flange 17, and the shape of the springs 6,7 that is needed adjacent the gap 19 is difficult to produce. The second embodiment of the invention, shown in FIG. 5, is also difficult to mould as care must be taken to ensure that both chambers 10,11 and 12,13 in each bush have the required size and shape.

Figure 6:
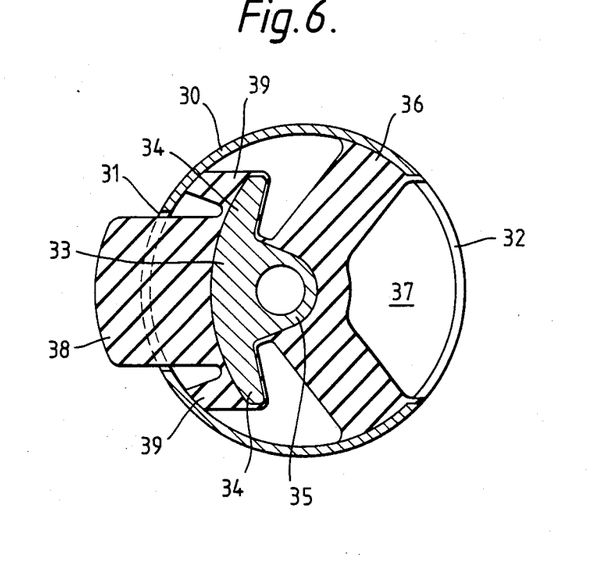
FIG. 6 shows a sectional view through part of a bush in a mounting device according to a third embodiment of the present invention.
Figure 7:
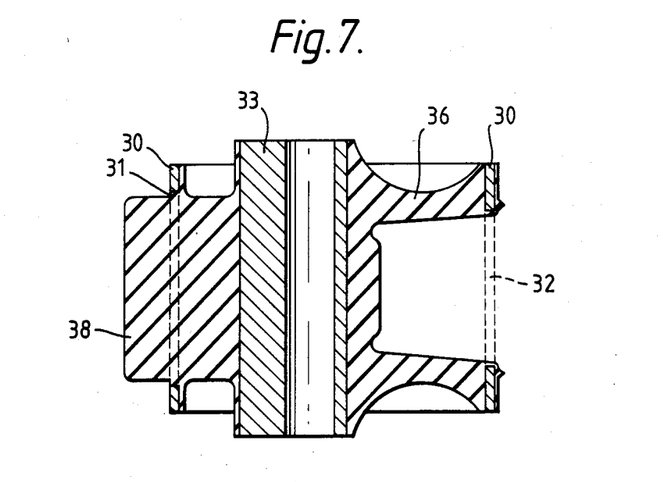
FIG. 7 shows another sectional view through part of the bush according to the third embodiment, perpendicular to the view in FIG. 6.
Figure 8A:
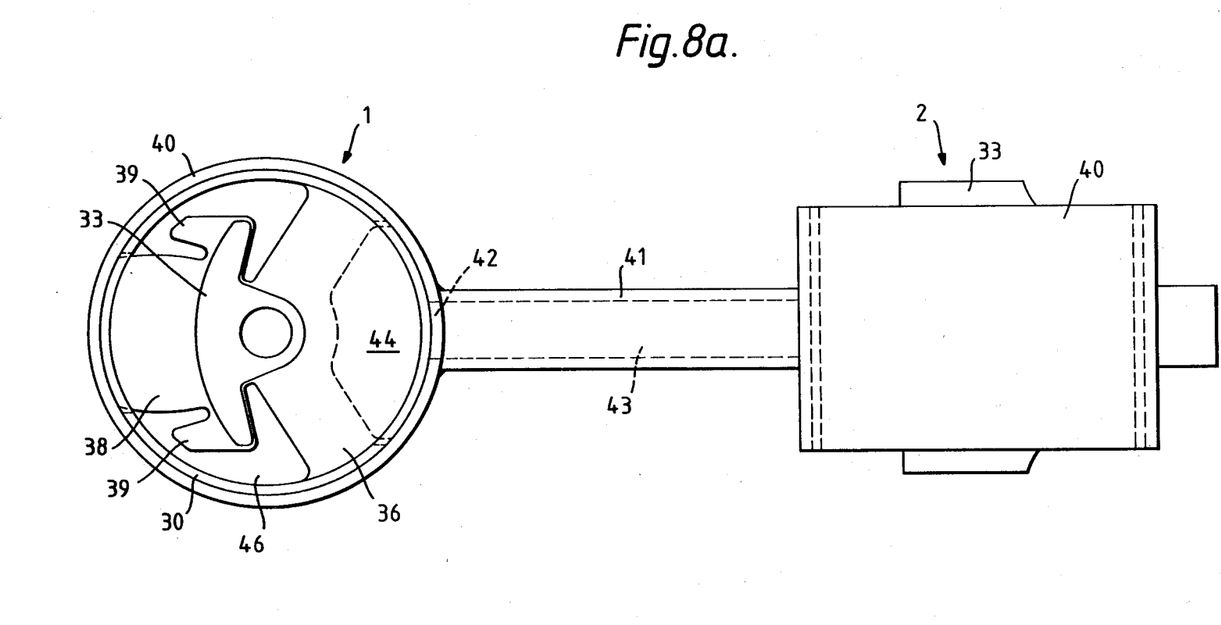
FIGS. 8a and 8b are sectional views through the mounting device of the third embodiment, the two views being perpendicular to each other.
Figure 8B:
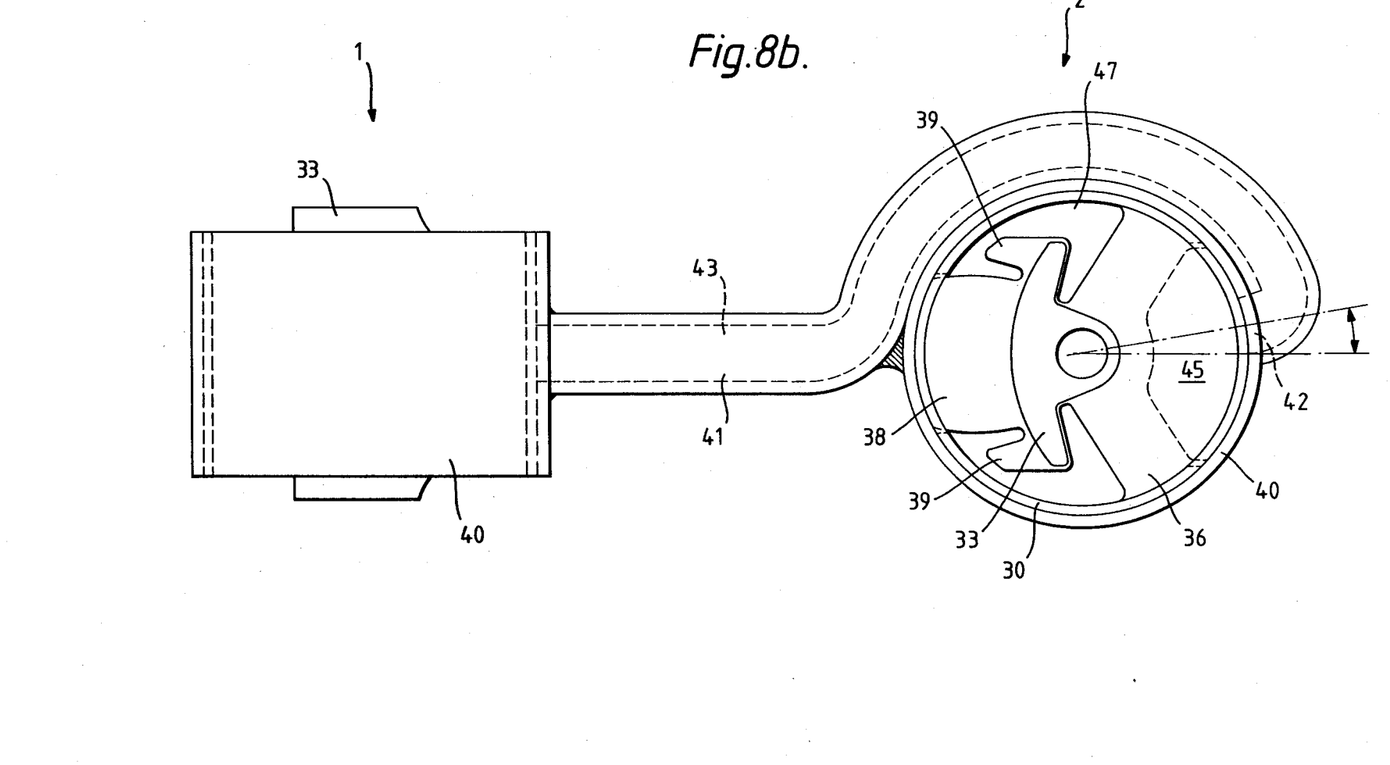

Therefore, the third embodiment of the present invention, illustrated in FIGS. 6 to 8, seeks to overcome these difficulties of manufacture. Firstly, a bush according to this embodiment uses a generally cylindrical inner housing 30 with apertures 31,32 at diagonally opposite sides. A sleeve 33 forming the anchor point of the bush is also modified, as compared with the sleeves 4,5 of the first and second embodiments, by the provision of wings 34 on either side of a central part 35. Then, a resilient spring 36 of rubber or rubber-type material is formed between the central part 35 of the sleeve 33 and a part of the inner surface of the inner housing 30 to form a space 37 which will subsequently form a working chamber. A rubber or rubber-like block 38 is moulded to the sleeve 33 which extends out of the aperture 31, and rubber or rubber-like stops 39 are moulded to the wings 34 and extend to the inner surface of the inner housing 30. However, unlike the spring 36, the stops 39 are not bonded to the inner surface of the inner housing 30, but simply rest on it in the position shown in FIG. 6. It can be seen from that figure that when the spring is moulded, the central axis of the sleeve 33 is displaced from the central axis of the inner housing 30, in a direction away from the space 37.

Two such bush parts are formed, and each is inserted into an outer housing 40 of first and second bushes 1,2 connected by a rigid rod 41. Each outer housing 40 has an aperture 42 which communicates with a passageway 43 in a bore in the rod 41, and the inner housings 30 are positioned so that their apertures 32 are aligned with the aperture 42 of the outer housings so that the spaces 37 form working chambers 44,45 connected by the passageway 43 in the rod 41. In this respect, this first embodiment is similar to the first embodiment. It should be noted, however, that the third embodiment is unlike the first and second embodiments in that the axes of the sleeves 33 of the two bushes 1 and 2 are perpendicular in the third embodiment, whereas they are parallel in the first and second embodiments. Thus the two views of FIGS. 8a and 8b are perpendicular to each other. It should also be noted that the entrance of the passageway 43 into the working chamber 45 of one of the bushes 2 is displaced from the axis of the rod 41.

When the inner housing 30 is inserted in the outer housing 40, the block 38 is forced inwards, moving the sleeve 33 so as to compress the spring 36. This gives the pre-compression of the spring necessary to ensure that the material of the spring 36 is not put under tension during vibration of the mount. The size and shape of the block 38 is determined by the desired pre-compression of the spring 36. Preferably, the stiffness of the block 38 is similar to the stiffness of the spring 36 so that the sleeve 33 moves half the compression applied to the block. In this way it is possible to ensure that the sleeve 33 is moved to the correct position in the housing; in general the sleeve 33 will have a central position in the absence of an external load.

When the block 38 and the sleeve 33 is forced inwardly, this moves the stops 39 away from the inner surface of the inner housing 30, as shown in FIG. 8. This enables them to act as vibration limiters, as movement of the sleeve 33 increasing the side of the working chamber 44, 45 eventually brings the stops 39 into contact with the inner surface of the inner housing 30, thereby causing an increase in the countering force. Movement of the sleeve 33 in the opposite direction is limited by the increase in compression in the spring 36, and this may be increased by the inward collapse of spring walls having the shape shown in FIG. 7.

In use, this embodiment is similar to the first embodiment, in that relative movement of the objects to which the sleeves 33 of the bushes 1,2 are attached causes compression of one working chamber and expansion of the other. Hydraulic fluid filling the chambers 44,45 and the passageway 43 moves from the chamber being compressed, through the passageway 43, and to the expanding chamber. The movement of the fluid acts as a damping force on the vibration of the objects connected by the mounting device.

Although generally similar to the first embodiment in operation, this third embodiment is easier to manufacture, and is therefore presently preferred. The spaces 46,47 on the opposite side of the spring 36 from the working chambers 44,45 may be vented to the air in order to prevent thermal changes in the characteristics of the mounting device, and a gas pocket may be provided communicating with the working chambers 44,45 in order to improve absorption of high frequency vibrations, as discussed earlier.

What is claimed is:

1. A hydraulically damped mounting device comprising:
   first and second bushes, each bush having a housing, an anchor point, and a resilient spring connecting said anchor point to said housing, said resilient spring of each said bush defining, together with a part of said housing of the corresponding bush, a working chamber for hydraulic fluid;
   an elongate connection rigidly connecting together said first and said second bushes; and
   an elongate passageway interconnecting said working chamber of each said bush for communication of hydraulic fluid therethrough;
   wherein said resilient spring of each said bush, together with a further part of said housing of the corresponding bush, defines an air chamber.

2. A hydraulically damped mounting device comprising:
   first and second bushes, each bush having a housing, an anchor point, and a resilient spring connecting said anchor point to said housing, said resilient spring defining, together with a first part of said housing of the corresponding bush a first working chamber for hydraulic fluid, and said resilient spring defining, together with a second part of said housing of the corresponding bush a second working chamber for hydraulic fluid;
   an elongate connection rigidly connecting together said first and second bushes;
   a first elongate passageway interconnecting the first working chamber of each said bush for communication of hydraulic fluid therethrough; and
   a second elongate passageway interconnecting the second working chamber of each said buch for communication of hydraulic fluid therethrough.

3. A hydraulically damped mounting device according to claim 1, wherein said first working chamber of said first bush is substantially between said second bush and said anchor point of said furst bush, and said anchor point of said second bush is substantially between said first bush and said first working chamber of said second bush.

4. A hydraulically damped mounting device comprising:
   first and second bushes, each having a housing, an anchor point, and a resilient spring connecting said anchor point to said housing, said resilient spring of each said bush defining, together with a part of said housing of the corresponding bush, a working chamber for hydraulic fluid;
   an elongate connection rigidly connecting together said first and said second bushes; and
   an elongate passageway interconnecting said working chamber of each bush for communication of hydraulic fluid therethrough;
   wherein the resilient spring of each said bush, together with a further part of said housing of the corresponding bush, defines a air space.

5. A hydraulically damped mounting device according to claim 4, wherein said anchor point of each said bush is elongate, and the direction of elongation of said anchor point of said first bush is perpendicular to the direction of elongation of said anchor point of said second bush.

6. A hydraulically damped mounting device according to claim 4, wherein said working chasber of said first bush is substantially between said second bush and said anchor point of said first bush, and said anchor point of said second bush is substantially between said first bush and said working chamber of said second bush.

7. A hydraulically damped mounting device according to claim 4, wherein said elongate connection has a bore therein, said bore defining said elongate passageway.

8. A hydraulically damped mounting device according to claim 4, wherein said housing of each said bush is hollow, and each said anchor point is within the corresponding housing.

9. A hydraulically damped mounting device according to claim 8, wherein a resilient member is provided between said anchor point and said housing of each said bush and is compressed therebetween, said resilient member being on the opposite side of said anchor point to said working chamber, thereby to cause compression of said resilient spring of each said bush in the absense of load on said hydraulically damped mounting device.

10. A hydraulically damped mounted device according to claim 8, wherein each said bush has at least one stop on said anchor point each said bush on the opposite side of said anchor point from said working chamber, whereby said at least one stop is adapted to limit movement of said anchor point in a direction away from said working chamber by contact of said at least one stop with said housing.

* * * * *

UNITED STATES PATENT AND TRADEMARK OFFICE
CERTIFICATE OF CORRECTION

PATENT NO. : 4,697,795

DATED : 6 October 1987

INVENTOR(S) : John P. West

It is certified that error appears in the above-identified patent and that said Letters Patent is hereby corrected as shown below:

In column 6, line 38 "buch" should be --bush--

In column 6, line 43 "furst" should be --first--

In column 7, line 2 "chasber" should be --chamber--

Signed and Sealed this

Twenty-sixth Day of April, 1988

Attest:

DONALD J. QUIGG

*Attesting Officer*  *Commissioner of Patents and Trademarks*